US008699162B1

(12) United States Patent
Grobis et al.

(10) Patent No.: US 8,699,162 B1
(45) Date of Patent: Apr. 15, 2014

(54) SHINGLED MAGNETIC RECORDING DISK DRIVE WITH MULTIPLE DATA ZONES CONTAINING DIFFERENT NUMBERS OF ERROR-CORRECTION-CODE SECTORS

(71) Applicant: HGST Netherlands B.V., Amsterdam (NL)

(72) Inventors: Michael Konrad Grobis, San Jose, CA (US); Manfred Ernst Schabes, Saratoga, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/680,089

(22) Filed: Nov. 18, 2012

(51) Int. Cl.
*G11B 5/00* (2006.01)

(52) U.S. Cl.
USPC .................. 360/48; 360/45; 360/55; 360/75

(58) Field of Classification Search
USPC .................. 360/39, 48, 55, 75, 77.04, 45, 47
See application file for complete search history.

(56) References Cited

U.S. PATENT DOCUMENTS

| 5,068,858 | A | | 11/1991 | Blaum et al. |
| 5,487,077 | A | | 1/1996 | Hassner et al. |
| 5,659,436 | A | * | 8/1997 | Yarmchuk et al. ............... 360/75 |
| 5,903,405 | A | * | 5/1999 | Takizawa .......................... 360/53 |
| 6,651,213 | B2 | | 11/2003 | Hassner et al. |
| 6,687,070 | B1 | * | 2/2004 | Peterson et al. ................. 360/53 |
| 6,747,827 | B1 | * | 6/2004 | Bassett et al. ................... 360/53 |
| 6,920,005 | B2 | | 7/2005 | Yun |
| 7,339,873 | B2 | * | 3/2008 | Nakagawa ................. 369/59.23 |
| 7,417,816 | B2 | | 8/2008 | Aratani et al. |
| 8,095,851 | B2 | | 1/2012 | Diggs et al. |
| 2004/0130818 | A1 | * | 7/2004 | Chliwnyj et al. ............ 360/72.1 |
| 2005/0073770 | A1 | * | 4/2005 | Ehrlich et al. .................. 360/75 |
| 2007/0030588 | A1 | * | 2/2007 | Tsuchinaga et al. ....... 360/77.08 |
| 2012/0281310 | A1 | * | 11/2012 | Lim et al. ................... 360/77.02 |
| 2013/0027806 | A1 | * | 1/2013 | Cho ............................... 360/75 |

OTHER PUBLICATIONS

Zhong et al., "High-Rate Quasi-Cyclic LDPC Codes for Magnetic Recording Channel with Low Error Floor", IEEE Int. Symp. on Circuits and Systems (ISCAS), May 2006, published online at http://www.ecse.rpiscrews.us/homepages/tzhang/pub/LDPCISCAS06.pdf.

* cited by examiner

*Primary Examiner* — Thomas Alunkal
(74) *Attorney, Agent, or Firm* — Thomas R. Berthold

(57) ABSTRACT

A shingled magnetic recording disk drive with sector error correction code (ECC) has the disk recording surface divided into multiple zones. Each zone is assigned a sector-ECC strength, i.e., a unique number of ECC sectors associated with a block of data sectors. The zone in which data is to be written is determined from the time average of the position-error signal (PES), which is an indication of the track misregistration (TMR) and thus the current environmental condition to which the HDD is subjected.

18 Claims, 3 Drawing Sheets

Table 1

| PES_RMS range | Zone Zi where data is written | Number of ECC sectors Ni in zone Zi |
|---|---|---|
| PES_0 < PES_RMS <= PES_max | Z0 | N0=6 |
| PES_1 < PES_RMS <= PES_0 | Z1 | N1=4 |
| PES_2 < PES_RMS <= PES_1 | Z2 | N2=3 |
| 0 <= PES_RMS <= PES_2 | Z3 | N3=2 |

Table 2
(NS>NS_max)

| PES_RMS range | Zone Zi where data is written | Number of ECC sectors Ni in zone Zi |
|---|---|---|
| PES_0 < PES_RMS <= PES_max | Z0 | N0=6 |
| PES_1 < PES_RMS <= PES_0 | Z0 | N0=6 |
| PES_2 < PES_RMS <= PES_1 | Z1 | N1=4 |
| 0 <= PES_RMS <= PES_2 | Z2 | N2=3 |

SHINGLED MAGNETIC RECORDING DISK DRIVE WITH MULTIPLE DATA ZONES CONTAINING DIFFERENT NUMBERS OF ERROR-CORRECTION-CODE SECTORS

BACKGROUND OF THE INVENTION

1. Field of the Invention

This invention relates generally to magnetic recording hard disk drives (HDDs), and more particularly to a shingled magnetic recording (SMR) HDD that uses error-correction-code sectors associated with blocks of data sectors.

2. Description of the Related Art

Magnetic recording disk drives that use "shingle writing", also called "shingled recording" or "shingled magnetic recording" (SMR), have been proposed, for example as described in U.S. Pat. No. 6,185,063 B1 and U.S. Pat. No. 6,967,810 B2. In SMR, the write head, which is wider than the read head in the cross-track direction, writes magnetic transitions by making a plurality of consecutive circular paths that partially overlap. The non-overlapped portions of adjacent paths form the shingled data tracks, which are thus narrower than the width of the write head. The data is read back by the narrower read head. The narrower shingled data tracks thus allow for increased data density. The shingled data tracks are arranged on the disk as annular bands separated by annular inter-band gaps or guard bands.

SMR HDDs may use error correction code (ECC) parity sectors for correction of errors in the data sectors. Sector-ECC has been proposed in SMR to enable ultra-high track densities with acceptable data sector failure rates. The writing of data to the data sectors in the shingled data tracks also includes the writing of error correction parity bits in the ECC sectors. The error correction bits in the ECC sectors are computed from the data to be written in the preceding block of data sectors, using an algorithm, like one of the well known ECC algorithms. When the data is read back from a sector the ECC detects errors and uses the error correction bits to correct the errors. However, sector-ECC increases the overhead of data that is used to ensure the integrity of the information and thus decreases the customer areal density. The strength of the ECC (the number of ECC sectors associated with a block of data sectors) is a global value of the HDD that is typically set during manufacturing based on factors such as the worst-case environmental condition, i.e., conditions which cause high track misregistration (TMR), or the intended use of the drive, e.g., short bursts of random data or long streams of data. However, the use of a fixed value for the number of ECC sectors that is too large can result in wasted disk space, and the use of a fixed value that is too small can result in data errors that cannot be corrected by the ECC.

What is needed is a SMR HDD that can adapt to changes in environmental conditions and type of data to optimize the strength of the ECC.

SUMMARY OF THE INVENTION

This invention relates to a SMR HDD with sector-ECC that adjusts the strength of the sector-ECC by monitoring suitable time averages of the position-error signal (PES). The disk recording surface is divided into multiple zones, with each zone assigned a sector-ECC strength, i.e., a unique number of ECC sectors associated with a block of data sectors. The zone in which data is to be written is determined from the time average of the PES, which is an indication of the track misregistration (TMR) and thus the current environmental condition to which the HDD is subjected.

In an optional feature of the invention, the type of data streams (long data streams versus frequent short data streams) is also monitored by providing a counter for accumulating the number of seeks (NS), i.e., movement or "seeking" of the write head by the actuator from one data track to a non-adjacent specified data track for writing, within a predetermined time period. If it is determined that NS is greater than a threshold, the data environment is deemed to likely comprise many short streams of data needing frequent seek times. In that case, the data may be written to a zone that has a larger number of ECC sectors than warranted by the time average of the PES. In this way, because more data sector errors can be tolerated because there are more ECC sectors available, data can be written before the end of the normal "settling" time for the write head following the seek.

Each of the zones is originally assigned a number of data tracks. As an optional feature of this invention, the zones can be provisioned according to the frequencies of writing data to the different zones, since such frequencies provide a running count of the conditions that the drive experiences. Based on the calculated frequencies, the number of tracks assigned to each zone is changed in proportion to the calculated frequencies.

For a fuller understanding of the nature and advantages of the present invention, reference should be made to the following detailed description taken together with the accompanying figures.

DETAILED DESCRIPTION OF THE INVENTION

Figure 1:
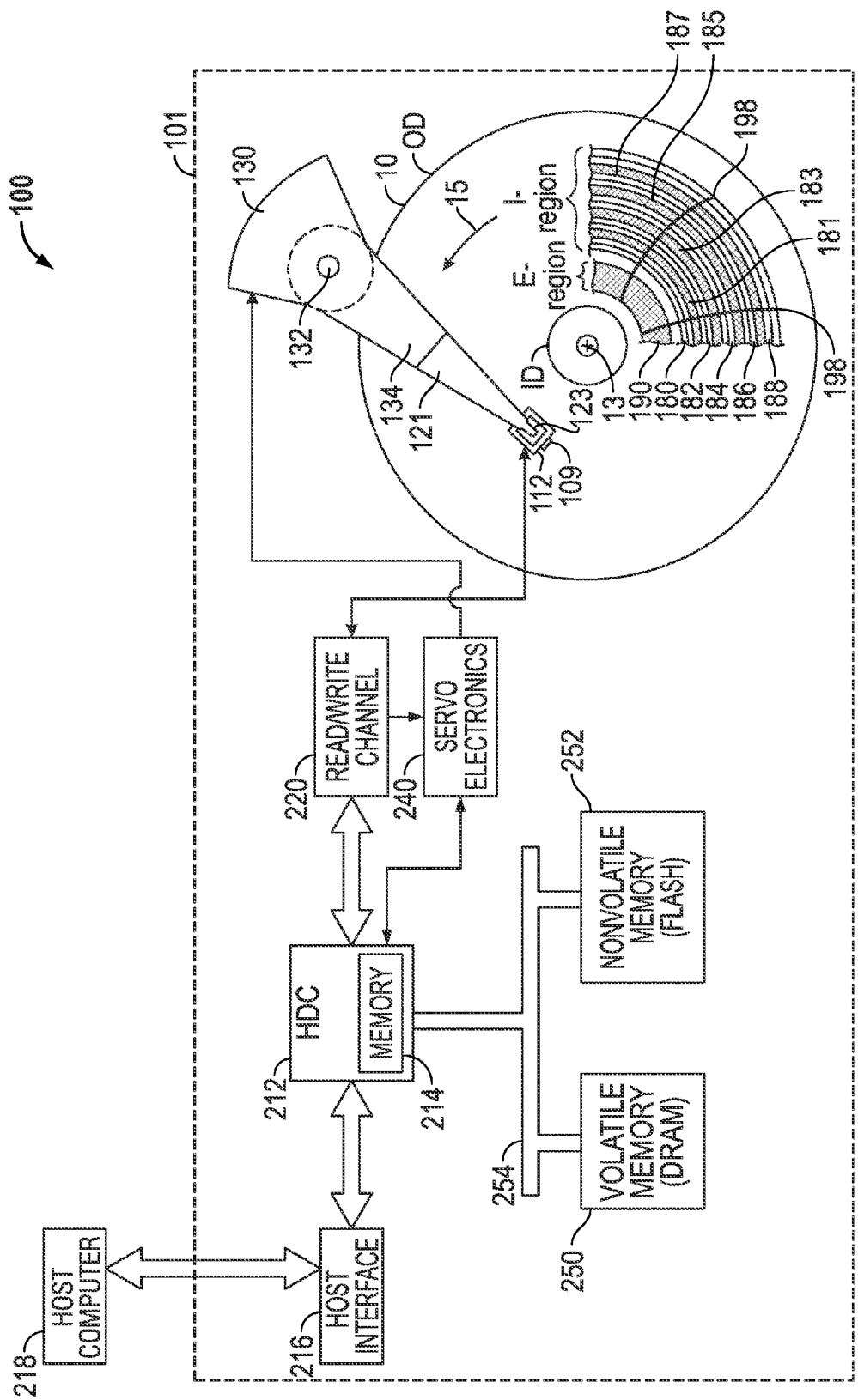
FIG. 1 is a top view of a disk drive with shingled recording according to the invention.

FIG. 1 is a top view of a HDD 100 with shingled recording according to the invention. The HDD has a housing or base 101 that supports an actuator 130 and a spindle motor (not shown) for rotating the magnetic recording disk 10 about its center 13 in the direction indicated by arrow 15. The actuator 130 may be a voice coil motor (VCM) rotary actuator that has a rigid arm 134 and rotates about pivot 132. A head-suspension assembly includes a suspension 121 that has one end attached to the end of actuator arm 134, a flexure 123 attached to the other end of suspension 121, and a head carrier, such as an air-bearing slider 122, attached to the flexure 123. The suspension 121 permits the slider 122 to be maintained very close to the surface of disk 10 and the flexure 123 enables the slider 122 to "pitch" and "roll" on an air-bearing generated by the rotating disk 10. The slider 122 supports the read/write or recording head 109 located on the end face 112 of slider 122. The recording head 109 is typically a combination of an inductive write head with a magnetoresistive read head (also called a read/write head). Only one disk surface with associated slider and recording head is shown in FIG. 1, but there are typically multiple disks stacked on a hub that is rotated by a spindle motor, with a separate slider and recording head associated with each surface of each disk.

In this invention the disk drive uses shingled magnetic recording (SMR), also called shingled writing. Thus FIG. 1 also illustrates portions of the circular shingled data tracks grouped as annular bands on the recording layer of disk 10. Only portions of five bands 180, 182, 184, 186 and 188 are depicted, but there would typically be a large number of bands. The group of bands, like typical bands 180, 182, 184, 186 and 188, are sometimes referred to in SMR as the "I-region" of the disk. Adjacent bands are separated by inter-band annular gaps, such as typical gaps 181, 183, 185 and 187. For example, for a 2.5 inch disk drive with shingled recording, the shingled data tracks may have a cross-track width (TW) of about 50 nm with each band containing several hundred tracks and with each gap separation between the bands being about 100 nm (or about 2 TW). In shingled recording the write head, which is wider than the read head in the cross-track direction, writes magnetic transitions by making a plurality of consecutive circular paths or tracks that partially overlap. The non-overlapped portions of adjacent paths or tracks form the shingled data tracks, which are thus narrower than the width of the write head. The data is read back by the narrower read head. When data is to be re-written in a shingled data track, all of the shingled data tracks that have been written after the track to be re-written may also need to be re-written if they contain valid data.

FIG. 1 also illustrates a region 190 of disk 10 with data tracks that function as an on-disk extended cache (E-cache), sometimes also called in SMR the "E-region". The E-region 190 is used as staging area for data that will ultimately be written to the I-region and typically contains enough data tracks equal to about 0.5-10.0% of the total capacity of the HDD. The E-region 190 is depicted as dedicated tracks near the disk ID, but it may be located anywhere on the disk 10, for example near a disk mid-diameter.

As is well known in the art, the data in each shingled data track in each of the bands is also divided into a number of contiguous physical data sectors (not shown in FIG. 1). The data sectors in an annular band can be separated by non-data fields, such as synchronization and servo fields, as well as data fields that are not associated with the annular band. Each data sector is preceded by a synchronization field, which is detectable by the read head for enabling synchronization of reading and writing the data bits in the data sectors.

Figure 2:
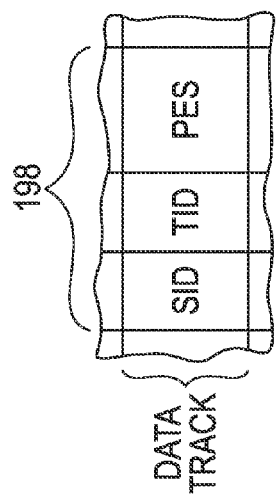
FIG. 2 is a schematic of a portion of a typical servo sector showing the servo identification (SID) field, the track identification (TID) field, and the position error signal (PES) field

Also as well known in the art, each shingled data track in each of the bands includes a plurality of circumferentially or angularly-spaced servo sectors 198 that contain positioning information detectable by the read head for moving the read/write head 109 to the shingled data tracks and maintaining the read/write head 109 on the tracks. Only two representative servo sectors 198 are shown in FIG. 1. The servo sectors 198 in each shingled data track are typically aligned circumferentially with the servo sectors in the other shingled data tracks so that they extend across the shingled data tracks in a generally radial direction, typically having a generally arcuate shape that replicates the path of the read/write head 109 as it moves across the surface of disk 10. The servo sectors 198 are nondata regions on the disk 10 that are magnetized once, typically during manufacturing or formatting of the disk, and are not intended to be erased during normal operation of the HDD. As shown in FIG. 2, each of the servo sectors 198 in a data track typically contains a servo identification (SID) field that indicates the start of the servo sector and serves as a timing reference for reading the subsequent servo information, a track identification (TID) field, which is typically a Gray-code, and a portion of a pattern of magnetized blocks or high-frequency bursts that form the head position error signal (PES) field. The PES fields are detected by the read head and decoded to provide a PES, which is a measure of how far the head is off track from the desired track centerline.

The HDD 100 also includes a hard disk controller (HDC) 212 that can include and/or be implemented by a microcontroller or microprocessor. The controller 212 runs a computer program that is stored in memory 214 and that embodies the logic and algorithms described further below. The memory 214 may be separate from controller 212 or as embedded memory on the controller chip. The computer program may also be implemented in microcode or other type of memory accessible to the controller 212. The controller 212 is connected to a host interface 216 that communicates with the host computer 218. The host interface 216 may be any conventional computer-HDD interface, such as Serial ATA (Advanced Technology Attachment) or SAS (Serial Attached SCSI). The electronics associated with HDD 100 also include servo electronics 240. In the operation of disk drive 100, the read/write channel 220 receives signals from the read head and passes servo information from the servo sectors to servo electronics 240 and data signals from the data sectors to controller 212. Servo electronics 240 includes a servo control processor that decodes the PES fields from the servo sectors 198 to run a control algorithm that produces a control signal. The control signal is converted to a current that drives actuator 130 to position the read/write head 109 to selected tracks.

In the operation of HDD 100, the controller 212 acts as a data controller to transfer blocks of write data from the host computer 218 through the read/write channel 220 for writing to the disk 10 by the write head, and to transfer blocks of read data from the disk 10 back to the host computer 218. Interface 216 receives commands from the host computer 218 for reading or writing blocks of data from or to the data sectors. The host computer 218 uses logical block addresses (LBAs) in commands to read and write blocks of data without regard for actual locations (physical block addresses or PBAs) used internally by the HDD. The controller 212 receives a list of LBAs from interface 216 and translates them into a set of PBAs that uniquely identify the disk surface, track and data sector. The PBAs are passed to servo electronics 240 to enable positioning read/write head 109 to the appropriate data sector.

Disk drives typically include, in addition to the rotating disk storage, solid state memory (referred to as "cache") that temporarily holds data before it is transferred between the host computer and the disk storage. The conventional cache is dynamic random access memory (DRAM), a volatile form of memory that can undergo a significant number of write/erase cycles and that has a high data transfer rate. Disk drives may also include nonvolatile memory. One type of nonvolatile memory is "flash" memory, which stores information in an array of floating gate transistors, called "cells" which can be electrically erased and reprogrammed in blocks. Thus in HDD 100, the controller 212 also communicates with volatile memory 250 (shown as DRAM) and optional nonvolatile memory 252 (shown as FLASH) via data bus 254.

In operation of the SMR disk drive the data is typically transferred from the DRAM cache 250 and written directly to the E-region 190. Then, during disk drive idle times, the data is read from the E-region 190 and written to the data bands in the I-region. In an SMR disk drive the PBA of a LBA can change frequently depending on write-history. For example, background processes such as defragmentation of the data bands moves data sectors from one PBA to another but the LBA remains the same. The LBA-PBA mapping can change with every write operation because the controller 212 dynamically determines the physical location on the disk where the host data for an LBA will be written. Thus the PBA for a LBA may change dynamically between the E-region 190 or a data band. The data for the same LBA will be written to a different location the next time the host LBA is updated. The dynamic LBA-PBA mapping system for a SMR disk drive that uses an E-region is described in U.S. application Ser. No. 13/200,418 filed Sep. 22, 2011 and assigned to the same assignee as this application.

Figure 3:
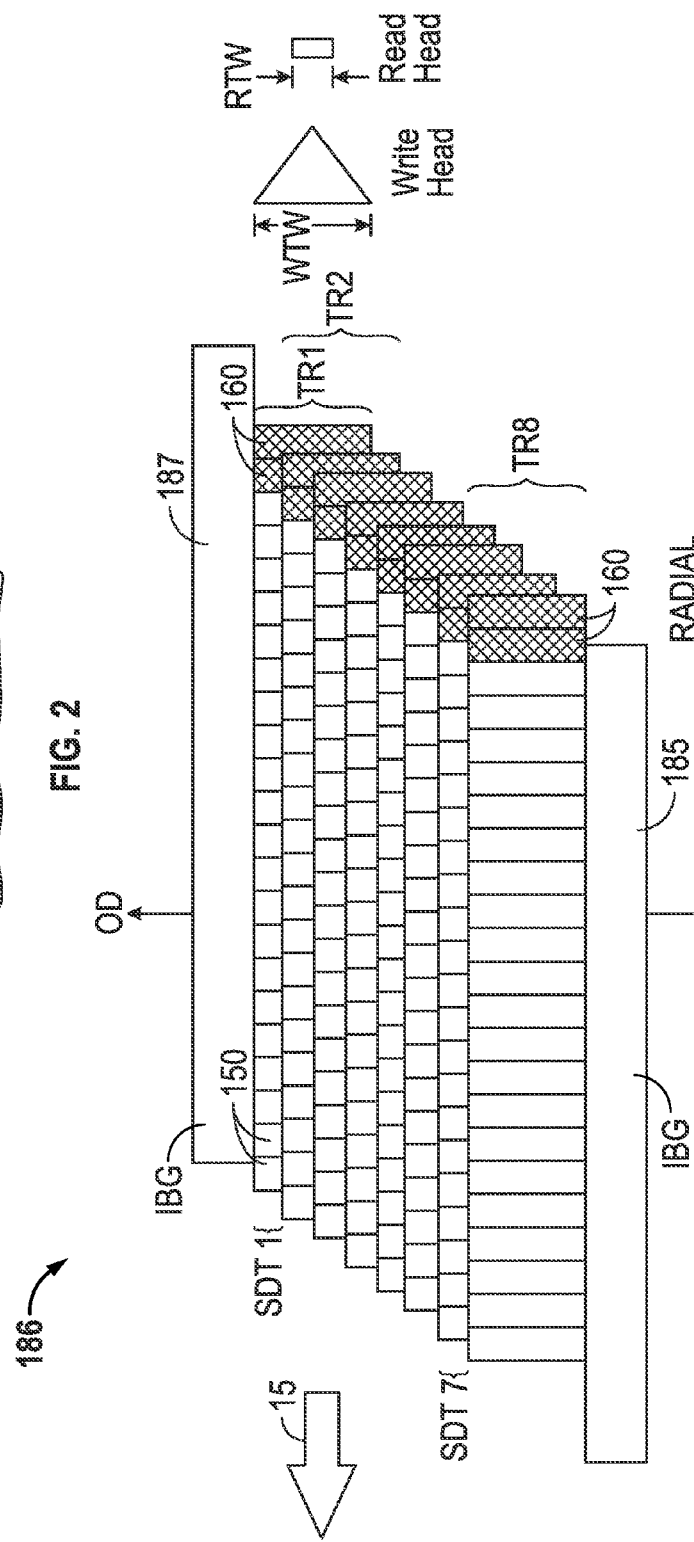
FIG. 3 is a schematic showing a typical band on a shingled magnetic recording (SMR) disk and illustrates the multiple overlapping tracks that define the shingled data tracks with blocks of data sectors and error-correction-code (ECC) sectors.
Figure 3:

FIG. 3 is a schematic of a shingled region or band, like band 186, for use in describing the method of SMR. A typical band will have a large number, i.e., several hundred or thousand, shingled data tracks (SDTs); however only 7 are shown in band 186 for ease of illustration. Each SDT is also depicted with only 21 data sectors like typical data sectors 150 in SDT1, also for ease of illustration. Band 186 has inter-band gaps (IBGs) 185, 187 that separate it from radially adjacent bands. The write head makes successive paths or tracks (TRs) to form the SDTs which, in the example of FIG. 2, are written in the direction from disk outside diameter (OD) to disk inside diameter (ID). The write pole tip of the write head has a cross-track width (WTW) that is wider than the sensing edge of the read head cross-track width (RTW). When writing data, the write head generates paths of magnetic transitions, represented by the vertical lines, as the recording layer moves in the direction of arrow 15. For example, the actuator positions the write head to write data along track 1 (TR1), then moves the write head to write data along track 2 (TR2). The writing of data along TR2 overwrites a portion of the previously written TR1 and thus "squeezes" the data of TR1 to thereby form the first shingled data track (SDT1). In the example of FIG. 2, the shingled data tracks are written in the direction from the disk OD to ID. However, a disk drive can be formatted such that writing of the shingled data tracks in one or more bands can be from ID to OD, with different bands being written in different directions.

In general, in SMR, whenever any portion of the data in an annular band is to be re-written or updated, all of the shingled data tracks in that annular band that were written after the shingled data track being updated are also re-written. Some data sectors may not need to be re-written if they are located at different circumferential positions from the re-written data sector or if they do not contain valid user data. The writing of data to an entire band may occur when new data from the host is stored in memory and then written to a band for the first time. It may also occur when a portion of the data in a band is modified, i.e., a "read-modify-write" operation in which units of data, such as single-track units, are read and stored in memory, then modified and written back to the band. The writing of data to an entire band or bands may also occur when a band or bands are "cleaned" or "de-fragmented" to reclaim free space, i.e., the data in one or more bands is read and stored in memory and then re-written to the same band or a new band.

FIG. 3 also illustrates the use of error correction code (ECC) parity sectors 160 in each track. Sector-ECC has been proposed in SMR to enable ultra-high track densities with acceptable sector failure rates. Sector-ECC is separate from the intra-sector ECC, i.e., ECC used within a sector. Intra-sector ECC is used to correct for errors when decoding a single sector, such as one of the sectors within an annular band. Intra-sector ECC will fail to decode a sector correctly if too many bit errors are present in the sector. Intra-sector ECC can employ any of the well known ECC schemes. Sector-ECC, on the other hand, works on the sector level and is invoked to correct sector decoding failure events within the associated annular band of sectors. When using sector-ECC, the writing of data to the data sectors also includes the writing of error correction parity bits in the ECC sectors 160. In the example of FIG. 3, there are two ECC sectors 160 associated with 21 data sectors. The error correction bits in the ECC sectors 160 are computed from the data to be written in the preceding 21 data sectors, using an algorithm, like one of the well known ECC algorithms. While the ECC sectors 160 need to be updated whenever the sectors within the scope of the sector-ECC are modified, the ECC sectors 160 only need to be read back when a sector cannot be decoded successfully using the intra-sector ECC alone. At this point, all of the data and ECC sectors within the scope of the sector-ECC are read back. Each sector is decoded first using its own ECC. The successfully decoded data and ECC sectors 160 are then used to compute the user data stored in the failed sectors. This process will be successful as long as the number of failed sectors is less than or equal to the number of ECC sectors 160. However, sector-ECC increases the overhead of data that is used to ensure the integrity of the information and thus decreases the customer areal density. The strength of the ECC (the number N of ECC sectors associated with a block of data sectors) is a global value of the drive that is typically set during manufacturing. The value N may be set, for example, in anticipation of the worst-case environmental conditions, i.e., conditions which cause high track misregistration (TMR), such as acoustic vibrations when a speaker is turned on inside a laptop or desktop computer. The value N may also be set, for example, in anticipation of the intended use of the drive, i.e., short bursts of random data (a larger N to allow for reduced settling time of the write head after seeks to new tracks) or long streams of data, such as for storing audio-visual content (a smaller N). However, the use of a fixed value for N that is too large can result in wasted disk space, and the use of fixed value for N that is too small can result in data errors that cannot be corrected by the ECC.

This invention is a SMR HDD that adjusts the strength of the sector-ECC by monitoring suitable time averages of the position-error signal (PES) and optionally also the suitable time average of the length of incoming data streams. As part of this invention the disk recording surface is divided into multiple zones Z0, Z1 . . . Zk with k>=1. Each zone Zi is assigned a sector-ECC strength of Ni, i.e., a number Ni of ECC sectors associated with a block of data sectors, where Ni is different for each zone. The zone in which data is to be written is determined from the time average of the PES, which is an indication of the TMR and thus the current environmental condition to which the HDD is subjected. The multiple zones Zi may be assigned as part of the HDD initialization or formatting during manufacturing. The multiple zones may be located in either or both of the I-region and E-region of the SMR HDD.

Figures 4, 5A, 5B:
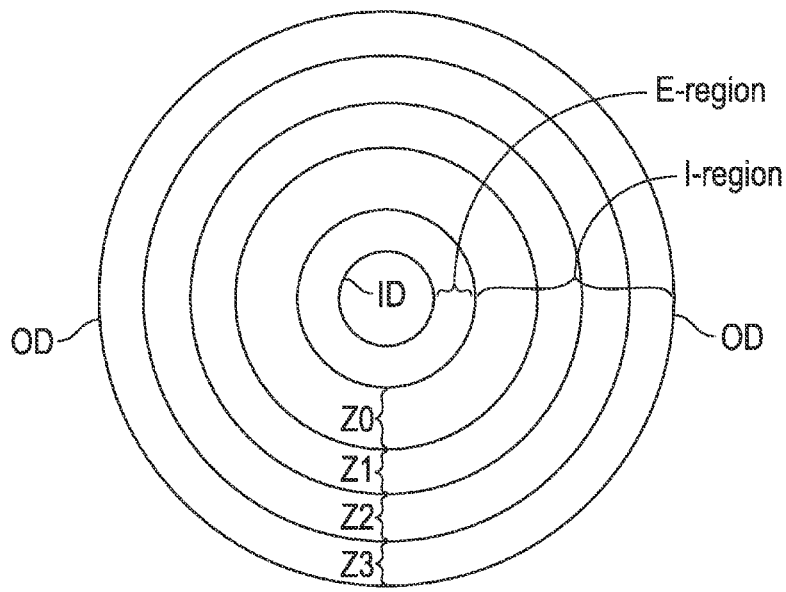
FIG. 4 is a schematic of an example of a disk according to the invention with the I-region containing four annular zones, each with a unique number of ECC sectors.
FIG. 5A shows a Table 1 with ranges of values for the PES time average value, associated zone numbers where data is to be written, and associated sector-ECC strength values.
FIG. 5B shows a Table 2 with ranges of values for the PES time average value, associated zone numbers where data is to be written, and associated sector-ECC strength values for the case where the number of seeks (NS) during a predetermined time period is greater than a predetermined threshold NS_max.

FIG. 4 is a schematic of an example of a disk according to the invention with the I-region containing four zones Z0, Z1, Z2 and Z3. Alternatively, or in addition to the I-region, the E-region may also contain a plurality of zones. In this example, the strength Ni of the sector-ECC is chosen to be highest in zone Z0 near the disk ID, where also the linear velocity of the head is lowest. Z0 thus may be more robust for writing during high-TMR conditions. For example, N0=6 in zone Z0, meaning that 6 parity sectors are used per data block. Zone Z1 has an intermediate number of parity sectors, e.g., N1=4, allowing higher customer data densities during less severe TMR conditions. Zone Z2 has an even lower number of parity sectors, e.g., N2=3, and zone Z3 has the lowest number of parity sectors, e.g., N3=2, allowing the highest customer areal density. Actual proportioning of the relative sizes of the zones, as well as the number of zones, is chosen depending on the drive type and its environment.

In the example shown in FIG. 4, the zone in which data is to be written is selected based on a suitable time average of the PES. The servo electronics 240 (FIG. 1) calculates the value of PES with each detection of the PES field in the servo sectors 198 as the servo sectors 198 pass the read head. The PES value represents the difference between the measured and desired cross track head position. The time average of the PESs (for example, over the time for several disk rotations) is calculated by the servo electronics 240 and passed to the HDC 212 or stored in memory 214 associated with the HDC. The HDC then uses the time average of the PES, for example the root-mean-squares average (PES-RMS), to select which of the four zones Z0-Z3 where the data should be written. Each of the zones is associated with a range of PES time average values. FIG. 5A shows a Table 1 with ranges of values for the PES time average value, zone numbers $Z_i$ where data is to be written, and sector-ECC strength $N_i$ values. The range in which the PES_RMS falls determines the zone selected for the writing of the data. For example, if PES_RMS is small, this indicates the head is track following with high accuracy and the data is written to zone Z3 with 2 parity sectors, thus guaranteeing a sector failure rate better than a specified tolerance, which may be chosen, for instance, to be approximately one failed sector per $10^{12}$ sectors. Conversely, if PES_RMS is large, there is a higher likelihood of TMR, which in turn would increase the chance of an uncorrectable sector failure beyond the acceptable sector failure rate were it not for the additional parity sectors that are provided in zones Z0, Z1, and Z2 of Table 1. In one embodiment of the invention for an exemplary drive with a track density of 1000 kilo tracks per inch (ktpi), the PES_RMS may be approximately 0-1.2 nm for zone Z3, approximately 1.2-2.4 nm for zone Z2, 2.4-3.6 nm for zone Z1, and 3.6-4.8 nm for zone Z0. The case where PES_RMS>4.8 nm leads to the HDC arresting write operations until environmental conditions improve, i.e., the drive waits until PES_RMS is less than 4.8 nm before selecting a zone. The above ranges are given as an example of possible definitions for the zones. In general, the mechanical characteristics of the drive, depending on the design of the components and the design of the system, will factor into the choices of zones and their definitions.

In an optional feature of the invention, the type of data streams (long data streams versus frequent short data streams) is also monitored by providing a counter for accumulating the number of seeks (NS) during a specified time interval ΔT. A "seek" refers to movement or "seeking" of the write head by the actuator from one data track to a non-adjacent specified data track for writing. The value of ΔT may be chosen to be, for example, in the range of 1-3 multiples of the time required for one disk rotation. If it is determined that NS>NS_max, where NS_max is a selectable threshold, the data environment is deemed to likely comprise many short streams of data needing frequent seek times. In that case, the data may be written to a zone that has a larger number of parity sectors than warranted by the information about the environmental conditions alone. In this way, because more data sector errors can be tolerated because there are more ECC sectors available, data can be written before the end of the normal "settling" time for the write head following the seek. This allows for faster throughput of data. In one approach to this optional feature, the zone for writing based on PES-RMS alone is identified from Table 1 in FIG. 5A, and then the data is written to a zone having more ECC sectors than the zone identified, for example the zone with the next higher number $N_i$ of ECC sectors. In another approach, Table 1 (FIG. 5A) can be used for the case where NS<NS_max, and a different table, like Table 2 (FIG. 5B), can be used for the case where NS>NS_max. In Table 2, if the PES_RMS falls within one of the three lowest ranges, the data is written to a zone with more ECC sectors than it would if Table 1 were used.

Each of the zones Z0-Z3 in the example of FIG. 4 is originally assigned a number of data tracks. As an optional feature of this invention, zones can be provisioned according to the frequencies of writing data to the different zones, since such frequencies provide a running count of the conditions that the drive experiences. Accordingly, a counter is provided for the write operations in each zone. Referring to the example of FIG. 4, if the total number of write operations to any zone Z0-Z3 is NW, then the number of write operations to zones Z0-Z3 is NW0-NW3, respectively. The write frequencies to the zones are calculated according to F0=NW0/NW, F1=NW1/NW, etc. A running count of the write events is taken for a selected minimum of time, e.g., 1 day of operation, or a minimum of data written, e.g., 10% of the total capacity, depending on the application of the drive. After the count is complete and the frequencies F0-F3 are computed, the HDC increases or reduces the number of tracks assigned to each zone Z0-Z3 in proportion to the frequencies F0-F3. The reapportionment may involve simply converting empty tracks of one zone type to another zone type. While a given zone does not need to be contiguous, it is understood that the reapportionment may include moving customer data within the same zone or across zones. If customer data is moved from one annular band to another, the sector-ECC will need to be updated to reflect the new data content.

In an alternative approach to determining the write frequencies to the different zones, the frequencies F0-F3 are calculated according to functions of the number of writes and the amount of data written. One such function, for instance, weighs the number of write operations with the amount of data written to each zone, namely, F1=NW1*B1/(NW*B_tot), F2=NW2*B2/(NW*B_tot), etc., where B1 is the amount of data written to zone 1, B2 is the amount of data written to zone 2, etc., and B_tot is total capacity of the zones Z0-Z3.

The operation of the HDD as described above may be implemented as a set of computer program instructions stored in memory and executable by a processor, such as the HDC, or a separate controller or microprocessor in the HDD. The controller performs logical and arithmetic operations based on the program instructions stored in memory, and is thus capable of performing the functions described above and represented in the figures.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A shingled magnetic recording disk drive comprising:
   a magnetic recording disk having a recording surface arranged in a plurality of annular zones, each zone having a plurality of concentric shingled data tracks containing data sectors, the recording surface also having a plurality of servo sectors containing position error signal (PES) fields extending generally radially across the shingled data tracks;

wherein each zone has a unique number of error correction code (ECC) sectors associated with a block of data sectors;

a write head associated with said disk surface for generating a magnetic write field to write data to the tracks;

a read head for reading data written in the tracks and for detecting the PES fields;

an actuator for moving the write head and read head to selected tracks;

servo electronics for decoding the PES fields into PES values;

a controller for controlling the writing of data by the write head to the tracks; and memory coupled to the controller and containing a program of instructions readable by the controller for determining the zone in which to write data, the program of instructions undertaking the method acts comprising:
(a) assigning to each zone a range of PES values;
(b) determining a time average value of decoded PES values;
(c) selecting a zone for which the time average value of decoded PES values is within the range of PES values; and
(d) writing data to a block of data sectors in said selected zone, computing error correction bits for said written data, and writing the computed error correction bits to the ECC sectors in said selected zone, the number of ECC sectors written with the error correction bits corresponding to the unique number of ECC sectors associated with said selected zone.

2. The disk drive of claim 1 wherein the time average value of decoded PES values is the root-mean-squares (RMS) time average value.

3. The disk drive of claim 1 wherein the method acts further comprise, if the time average value of decoded PES values is greater than the greatest of PES values in said ranges, not performing steps (c) and (d) until the time average value of decoded PES values is less than the greatest of PES values in said ranges.

4. The disk drive of claim 1 wherein the concentric shingled data tracks in each zone are arranged in a plurality of annular bands, the bands being separated by annular inter-band gaps.

5. The disk drive of claim 1 wherein the annular bands comprise an extended cache region (E-region), wherein the data to be written to the E-region is stored in said memory, and wherein the controller retrieves the data to be written to the E-region from said memory.

6. The disk drive of claim 1 wherein the method acts further comprise, prior to selecting a zone, counting the number of seeks (NS) of the actuator moving the write head from one track to a non-adjacent track within a predetermined time period.

7. The disk drive of claim 6 wherein the method acts further comprise comparing NS to a predetermined value NS_max, and wherein selecting a zone comprises selecting a zone in response to said comparison.

8. The disk drive of claim 6 wherein assigning to each zone a range of PES values comprises storing in memory a first table of zone numbers and associated ranges of PES values and storing in memory a second table of zone numbers and associated ranges of PES values, and wherein selecting a zone comprises selecting one of said tables in response to the value of NS.

9. The disk drive of claim 1 wherein each zone contains a number of assigned data tracks, and wherein the method acts further comprise calculating the frequency of write operations to each zone and reapportioning the number of assigned data tracks to the zones in proportion to the calculated frequencies.

10. The disk drive of claim 9 wherein the act of calculating the frequency of write operations to each zone comprises calculating the amount of data written to each zone.

11. A shingled magnetic recording disk drive comprising:
a magnetic recording disk having a recording surface arranged in a number of annular zones Z0 through Zk where k is an integer greater than 0, each zone having a plurality of concentric shingled data tracks containing data sectors and arranged in a plurality of annular bands, the bands being separated by annular inter-band gaps, the recording surface also having a plurality of servo sectors containing position error signal (PES) fields extending generally radially across the shingled data tracks;

wherein each zone Zi has Ni error correction code (ECC) sectors associated with a block of data sectors, where i is the zone number and where Ni is different for each N0 through Nk;

a write head associated with said disk surface for generating a magnetic write field to write data to the tracks;

a read head for reading data written in the tracks and for detecting the PES fields;

an actuator for moving the write head and read head to selected tracks;

servo electronics for decoding the PES fields into PES values;

a controller for controlling the writing of data by the write head to the tracks; and memory coupled to the controller and containing a program of instructions readable by the controller for determining the zone Zi in which to write data, the program of instructions undertaking the method acts comprising:
(a) assigning to each zone Zi a unique range of PES values;
(b) determining a time average value of decoded PES values;
(c) selecting a zone Zi for which the time average value of decoded PES values is within the range of PES values; and
(d) writing data to a block of data sectors in selected zone Zi and error correction bits associated with said written data to Ni ECC sectors in said selected zone Zi.

12. The disk drive of claim 11 wherein the time average value of decoded PES values is the root-mean-squares (RMS) time average value.

13. The disk drive of claim 11 wherein the greatest PES value in all of said ranges of PES values is PES_max, and wherein the method acts further comprise, if the time average value of decoded PES values is greater than PES_max, not performing steps (c) and (d) until the time average value of decoded PES values is less than PES_max.

14. The disk drive of claim 11 wherein the method acts further comprise, prior to selecting a zone, counting the number of seeks (NS) of the actuator moving the write head from one track to a non-adjacent track within a predetermined time period.

15. The disk drive of claim 14 wherein the method acts further comprise comparing NS to a predetermined value NS_max, and wherein selecting a zone comprises selecting a zone in response to said comparison.

16. The disk drive of claim 14 wherein assigning to each zone a range of PES values comprises storing in memory a first table of zone numbers and associated ranges of PES values and storing in memory a second table of zone numbers and associated ranges of PES values, and wherein selecting a zone comprises selecting one of said tables in response to the value of NS.

17. The disk drive of claim 11 wherein each zone contains a number of assigned data tracks, and wherein the method acts further comprise calculating the frequency of write operations to each zone and reapportioning the number of assigned data tracks to the zones in proportion to the calculated frequencies.

18. The disk drive of claim 17 wherein the act of calculating the frequency of write operations to each zone comprises calculating the amount of data written to each zone.

\* \* \* \* \*